US008417691B2

(12) United States Patent
Brodsky et al.

(10) Patent No.: US 8,417,691 B2
(45) Date of Patent: Apr. 9, 2013

(54) CLIENT AND DATABASE PROBLEM DETERMINATION AND MONITORING

(75) Inventors: Stephen Andrew Brodsky, Los Gatos, CA (US); Zeus Orion Courtois, San Jose, CA (US); Anshul Dawra, San Jose, CA (US); Tom William Jacopi, San Jose, CA (US); Tony Kai-chi Leung, San Jose, CA (US); Sonali Surange, San Rafael, CA (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 12/634,597

(22) Filed: Dec. 9, 2009

(65) Prior Publication Data

US 2011/0137891 A1   Jun. 9, 2011

(51) Int. Cl.
*G06F 7/00* (2006.01)
*G06F 17/30* (2006.01)

(52) U.S. Cl.
USPC ........................................................ 707/718

(58) Field of Classification Search .................. 707/718, 707/999.003
See application file for complete search history.

(56) References Cited

U.S. PATENT DOCUMENTS

| | | | |
|---|---|---|---|
| 6,804,627 B1 | 10/2004 | Marokhovsky et al. | |
| 7,325,016 B1 | 1/2008 | Shee | |
| 2003/0033132 A1* | 2/2003 | Algieri et al. .................. | 703/22 |
| 2005/0010578 A1 | 1/2005 | Doshi | |
| 2005/0165741 A1* | 7/2005 | Gordon ............................ | 707/3 |
| 2005/0262060 A1 | 11/2005 | Rohwedder et al. | |
| 2006/0212417 A1 | 9/2006 | Barsness et al. | |
| 2006/0212428 A1* | 9/2006 | Nelson ............................... | 707/3 |
| 2006/0218125 A1 | 9/2006 | Kandil et al. | |
| 2007/0174710 A1 | 7/2007 | Duan et al. | |
| 2008/0052271 A1 | 2/2008 | Lam | |
| 2008/0177748 A1 | 7/2008 | Rondot | |
| 2008/0235182 A1* | 9/2008 | Baranczyk et al. ............... | 707/2 |
| 2008/0250073 A1 | 10/2008 | Nori et al. | |
| 2008/0256059 A1* | 10/2008 | Chang et al. ....................... | 707/5 |
| 2008/0270356 A1* | 10/2008 | Anderson et al. ................. | 707/3 |
| 2008/0275843 A1* | 11/2008 | Lal et al. ........................... | 707/3 |
| 2008/0301148 A1 | 12/2008 | Lee et al. | |
| 2008/0319959 A1 | 12/2008 | Bireley et al. | |

(Continued)

OTHER PUBLICATIONS

Bowman, I.T., P. Bumbulis, D. Farrar, A.K. Goel, B. Lucier, A. Nica, G.N. Paulley, J. Smirnios, and M. Young-Lai, "SQL Anywhere: An Embeddable DBMS", © 2007 IEEE, 8 pp.

(Continued)

*Primary Examiner* — Alexey Shmatov
(74) *Attorney, Agent, or Firm* — Janaki K. Davda; Konrad, Raynes, Davda & Victor LLP (57) ABSTRACT

Provided are techniques for collecting client information for client applications running on a client computer, wherein the client information includes a client application identifier for each client application that issues queries to a database along with text of each of the queries that the client application issues; collecting database monitoring information that includes text of each query issued against the database and performance information for each query; combining the client information and the database monitoring information based on the text of the queries to obtain combined information that provides the client application identifier and the performance information for each of the queries; and identifying a problem query and at least one client application that has issued the problem query using the combined information.

21 Claims, 11 Drawing Sheets

U.S. PATENT DOCUMENTS

2009/0077016 A1 3/2009 Belknap et al.
2009/0106741 A1 4/2009 Dageville et al.
2009/0106746 A1 4/2009 Chaudhuri et al.

OTHER PUBLICATIONS

Chaudhuri, S., A.K. Gupta, and V. Narasayya, "Compressing SQL Workloads", ACM SIGMOD 2002, Jun. 4-6, 2002, 12 pp.
Laine, T. and A. Saarinen, "NetOgler, A Distributed Data Gathering Platform", Sep. 2008, 12 pp.
Scanlon, M.N., "Take the IBM Data Studio Tour", Dec. 6, 2007, IBM Corporation, 33 pp.
PCT International Search Report and Written Opinion, Mar. 31, 2011, for International Application No. PCT/EP2010/068299, Total 10 pp.

* cited by examiner

| CLIENT APPLICATION IDENTIFIER | TEXT OF QUERIES | CLASSES | METHODS | VERSION OF SOURCE CODE | ... |
|---|---|---|---|---|---|
| | | | | | |

| CONNECTION IDENTIFIER | TEXT OF QUERIES | QUERY PERFORMANCE STATISTICS | RESOURCES USED BY QUERY | ... |
|---|---|---|---|---|
| | | | | |

| CLIENT APPLICATION IDENTIFIER | TEXT OF QUERIES | CLASSES | METHODS | VERSION OF SOURCE CODE | CONNECTION IDENTIFIER | QUERY PERFORMANCE STATISTICS | RESOURCES USED BY QUERY | ... |
|---|---|---|---|---|---|---|---|---|
| | | | | | | | | |

CLIENT AND DATABASE PROBLEM DETERMINATION AND MONITORING

BACKGROUND

1. Field

Embodiments of the invention relate to client and database problem determination and monitoring.

2. Description of the Related Art

Databases are computerized information storage and retrieval systems. Relational databases are organized into tables that consist of rows and columns of data. The rows may be called tuples or records or rows. A database typically has many tables, and each table typically has multiple rows and multiple columns.

Relational DataBase Management System (RDBMS) software may use a Structured Query Language (SQL) interface. The SQL interface has evolved into a standard language for RDBMS software and has been adopted as such by both the American National Standards Institute (ANSI) and the International Standards Organization (ISO).

A query (e.g., a SQL statement) may be described as a request for information from a database based on specific conditions. A query typically includes one or more predicates. A predicate may be described as an element of a search condition that expresses or implies a comparison operation (e.g., A=3).

Traditional monitoring and problem determination tools have focused on particular areas of expertise. For example, a database monitoring tool reports details of operations of a database, including identifying queries that the database is processing on behalf of client applications. As another example, a client application profiling tool reports details of a client application's run, including identifying queries that the client application has issued.

Applications and databases interact with each other. For example, applications that persist data often use SQL statements to access and manipulate data in the database. Most of the client applications today are used in running a business. When the monitoring and problem determination tools stop gathering information at a time at which a call crosses between the client application and the database, the monitoring and problem determination tools present one side of the data. For example, Database Administrators (DBAs), who use database monitoring tools, cannot tell which application the SQL statements are coming from. Without this information, the DBAs are unable to determine the contacts when the SQL statements encounter problems in the database. Contacts may be described as contact persons for an application should the application misbehave in the production environment. For example, an application developer who wrote the application may be a contact.

Similarly, application developers cannot tune client applications based on data gathered by the database monitoring tools because they do not have insight into the performance of client applications with the database operation taken into account when the call crosses between the client application and the database. That is, once a database call is made, what happens during the database call is usually unknown to the application developer.

Moreover, the problem extends beyond database monitoring and application tuning Workload management is a very powerful tool in the hands of a system administrator. A DBA may be described as a specialized system administrator. In a small business, the DBA may be the system administrator, while, in a larger organization, there may be a DBA and a system administrator. With workload management, a system administrator may allocate more processor time to client applications that need additional time. The lack of identification of which client application issued which queries comes into play again in this scenario. Just by looking at the database activities, the system administrator cannot deduce the client application that is generating the workload, and, without this information, there is no means to identify the client application that should be given priority for running.

With the proliferation of persistence frameworks, such as JAVA® Persistence API (JPA) framework, that isolate the client application from the underlying database, the distance between the client application and the underlying database increases (JAVA is a trademark of Sun Microsystems in the United States, other countries, or both). Thus, there is need for improved client side end to end problem determination and monitoring.

BRIEF SUMMARY

Provided are a method, computer program product, and system for collecting client information for client applications running on a client computer, wherein the client information includes a client application identifier for each client application that issues queries to a database along with text of each of the queries that the client application issues; collecting database monitoring information that includes text of each query issued against the database and performance information for each query; combining the client information and the database monitoring information based on the text of the queries to obtain combined information that provides the client application identifier and the performance information for each of the queries; and identifying a problem query and at least one client application that has issued the problem query using the combined information.

BRIEF DESCRIPTION OF THE SEVERAL VIEWS OF THE DRAWINGS

Referring now to the drawings in which like reference numbers represent corresponding parts throughout:

FIG. 4 is formed by FIGS. 4A and 4B.

FIG. 6 is formed by FIGS. 6A, 6B, 6C, and 6D.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments bridge the gap between the client application and the resources that the client application consumes in the database, giving insight into the performance of the entire client application, from its high level JAVA® classes to the underlying query (e.g., SQL statement) operations performed on behalf of the client application by the database.

Figure 1:
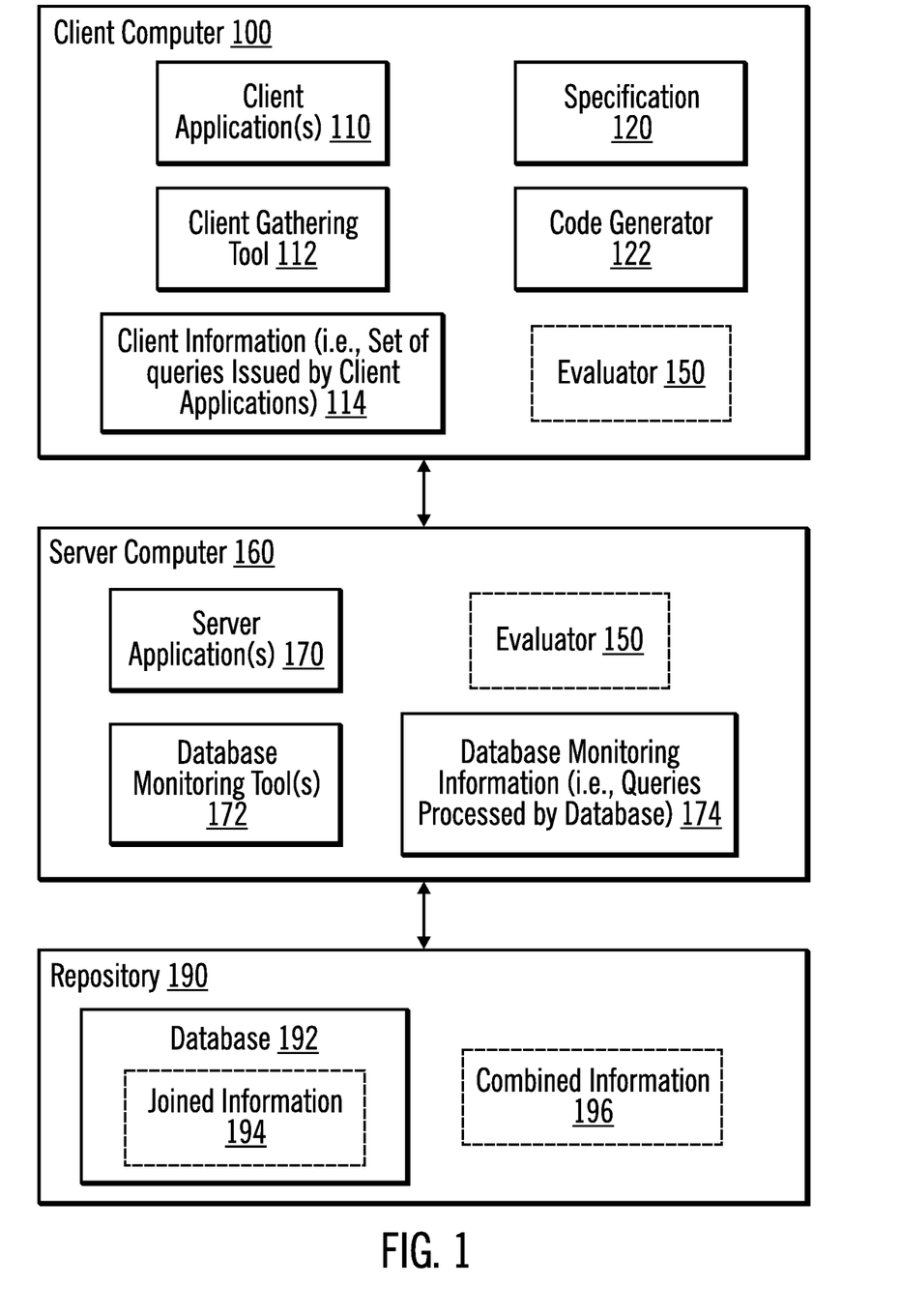
FIG. 1 illustrates, in a block diagram, a computing environment in accordance with certain embodiments of the invention.

FIG. 1 illustrates, in a block diagram, a computing environment in accordance with certain embodiments of the invention. A client computer 100 is coupled to a server computer 160. The server computer 160 is coupled to a repository 190 storing a database 192 and combined information 196. The server computer 160 provides the client computer 100 with access to the database 192.

The client computer 100 includes one or more client applications 110, one or more client gathering tools 112, and client information 114 (i.e., information about queries issued by client applications 110). The client computer 100 also includes a specification of a client application 120 ("specification") and a code generator 122. The specification 120 is in some language that the code generator 122 is able to read. The server computer 160 includes one or more server applications, one or more database monitoring tools 172, and database monitoring information 174 (i.e., information about queries processed by the database 192). An evaluator 150 may be located at the client computer 100, at the server computer 160, or at another computer system (not shown). In certain embodiments, the client information 114 and the database monitoring information 174 may be stored in the database 192 as relational tables. In certain embodiments, when, the evaluator 150 combines the client information 114 and the database monitoring information 174, the combined information 196 is stored in the repository 190. However, in other embodiments, the combined information 196 may be stored elsewhere. In certain embodiments, the combining involves joining the client information 114 stored in a table and the database monitoring information 174 stored in a table to generate joined information 194 in a table, which is stored in the database 192.

In certain embodiments, a database monitoring tool 172 is enhanced to incorporate the logic of the evaluator 150 within it, thus giving the database monitoring tool 172 new capabilities. In certain other embodiments, the evaluator 150 is a new tool that reads the information 174 generated by the database monitoring tool 172 and the information 114.

The repository 190 may comprise an array of storage devices, such as Direct Access Storage Devices (DASDs), Just a Bunch of Disks (JBOD), Redundant Array of Independent Disks (RAID), virtualization device, etc.

Embodiments recognize there is a common thread that ties the client application 110 and the database 192 together: the queries (e.g., SQL statements). The client application 110 run is confined to the client domain until the client application 110 accesses data stored in the database 192. The query is the means by which the client application 110 communicates with the database 192. Even if a framework is used, the framework communicates with the database 192 through queries. By using the queries as the key, embodiments expand on both the client application 110 side and the database 192 side to collect information on the client application 110 run.

Figure 2:
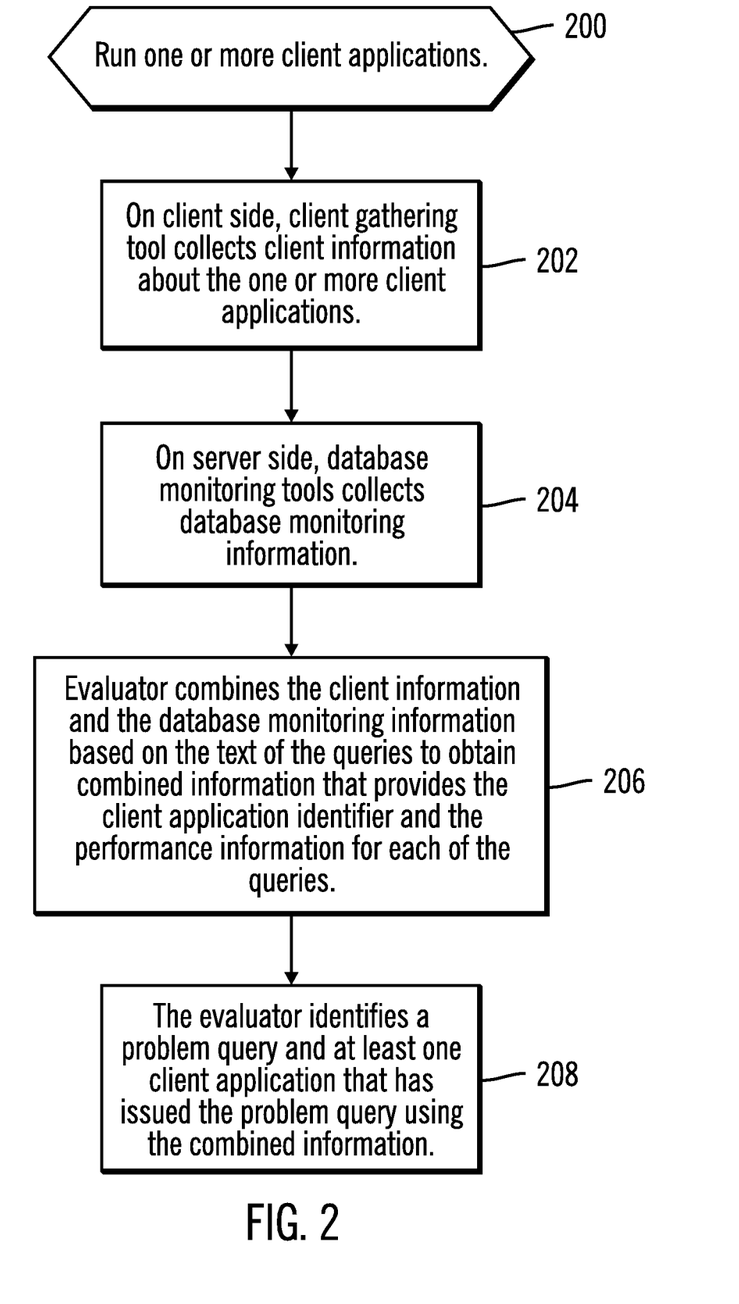
FIG. 2 illustrates logic for identifying at least one client application that has issued a problem query in accordance with certain embodiments.
Figure 3A:
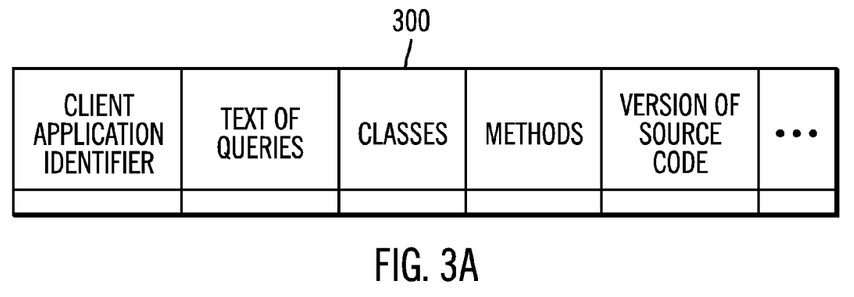
FIG. 3A illustrates a sample table for storing client information in accordance with certain embodiments.

FIG. 2 illustrates logic for identifying at least one client application that has issued a problem query in accordance with certain embodiments. Control begins at block 200 with one or more client applications 110 running. In block 202, on the client side, a client gathering tool 112 collects client information 114 about the one or more client applications 110. The client information 114 includes the source code being run and the lines of source code participating in the calling of functions that send queries (e.g., SQL statements) to the database 192. The client gathering tool 112 stores the client information 114 at the client computer 100. In certain embodiments, to collect information about the one or more client applications 110, the client gathering tool 112 creates one or more relational tables, and each of the relational tables includes: a column identifying a client application issuing a query, a column for the text of the query used (i.e., query text), a column for classes, a column for methods, a column for a version of the source code that issues the query, and may include other columns. FIG. 3A illustrates a sample table 300 for storing client information 114 in accordance with certain embodiments. The ellipses indicate that additional columns may be included in the table 300.

The client information 114 describes how the client application 110 issues the query. The client information 114 may be collected in various ways, such as by code generators as source code is generated or by client application profiling tools that observe the client application's runtime behavior automatically. For example, the code generator 122 generates a client application 110 based on the specification 120. At the time of code generation, the code generator 120 writes the client information 114 (e.g., records the source information in relational tables). On the other hand, if the application is written by an application programmer, the client gathering tool 112 scans the source code, looking for the database calls, or the client gathering tool 112 observes the client application's behavior during a run. That is, if the client application 110 does not rely on any generated code, the client gathering tool 112 observes the running client application 110. A client application 110 may be described as having two parts: the code used by the client application and a database access library. The database access library may be provided by a vendor with the purpose of monitoring the behavior of the client application using a proxy technique. For example, when the client application 110 requests a connection object to issue SQL statements, the database access library returns a proxy that wraps the connection object. This proxy is then used to monitor the SQL statements issued by the client application 110. The calling stack information may also be recorded in the relational table to associate the SQL statements being issued by the client application 110 with source code, along with the version of the source code used. In particular, when the client application 110 issues SQL statements to the database 192 through the database access library, the database access library may ask the JAVA® runtime using a JAVA® built-in function for information about the caller and the callee, thus the database access library knows how it is being invoked, and this information is included in the call stack information. The goal in collecting information about the client application 110 is to record in detail the APIs used by the client application 110 to issue the SQL statements against the database 192.

Figure 3B:
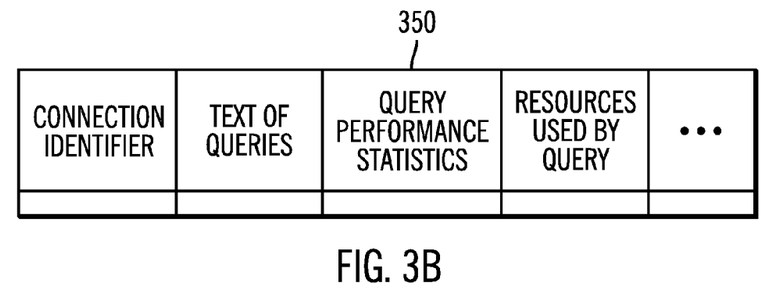
FIG. 3B illustrates a sample table for storing database monitoring information in accordance with certain embodiments.

In block 204, on the server side, one or more database monitoring tools 172 collect database monitoring information 174. In certain embodiments, the database monitoring tool 172 creates one or more relational tables, and each of the relational tables includes: a column for a connection identifier (which identifies a connection used by the client application to issue the query), a column for text of a query running in the database 192, a column for query performance statistics of the query, a column for resources that the query uses (e.g., tables that the query accesses), and other information relating to the database access. FIG. 3B illustrates a sample table 350 for storing database monitoring information 174 in accordance with certain embodiments. The ellipses indicate that additional columns may be included in the table 300. In certain embodiments, the database monitoring tool 172 collects at least the text of the query being issued.

In block 206, the evaluator 150 combines the client information 114 and the database monitoring information 174 based on the text of the queries to obtain combined information 196 that provides the client application identifier and the performance information for each of the queries. In block 208, the evaluator 150 identifies a problem query and at least one client application that has issued the problem query using the combined information 196.

Thus, the evaluator 150 ties the two sets of information 114, 174 together. In certain embodiments, because both table 300 and table 350 store the text of queries, the evaluator 150 joins tables 300 and 350 based on the text of the queries. This minimizes changes to the client application 110 to collect more information, and no new work needs to be done on the server computer 160 (e.g., the database monitoring tool 172 does not change). For example, with reference to the minimized changes, without client gathering tool 112 and code generation tool 122, application developers may have to add additional code to a client application 110 to collect performance information (e.g., query performance statistics). For example, an application developer may have to print the timestamp before/after the database call and do the performance analysis manually. With the queries as the key, the evaluator 150 puts the client information 114 and the database monitoring information 174 together in a coherent form that may be used by both the application developers and the DBAs.

Figure 4A:
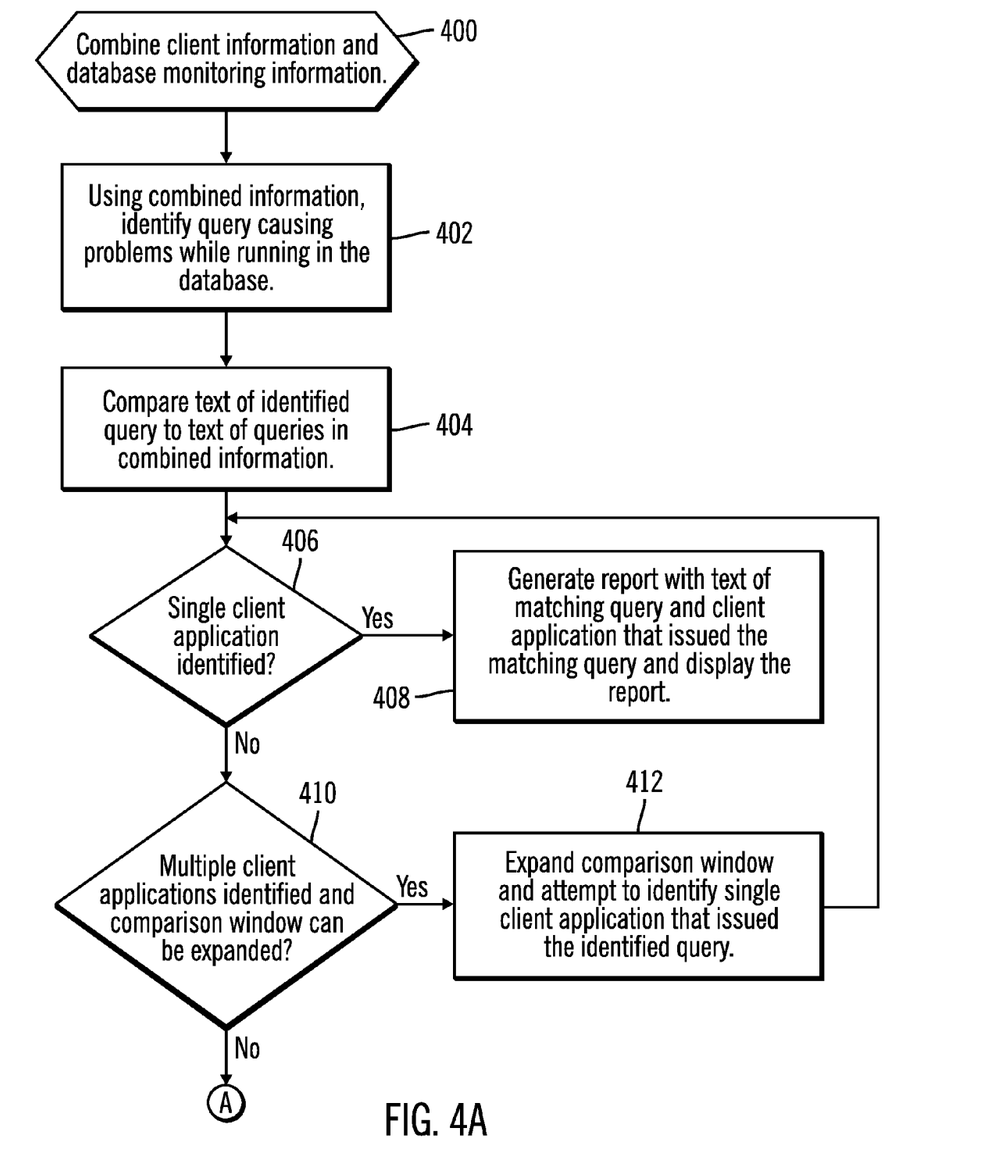
FIG. 4 illustrates more detailed logic for identifying a client application that has issued a problem query in accordance with embodiments of the invention.
Figure 4B:
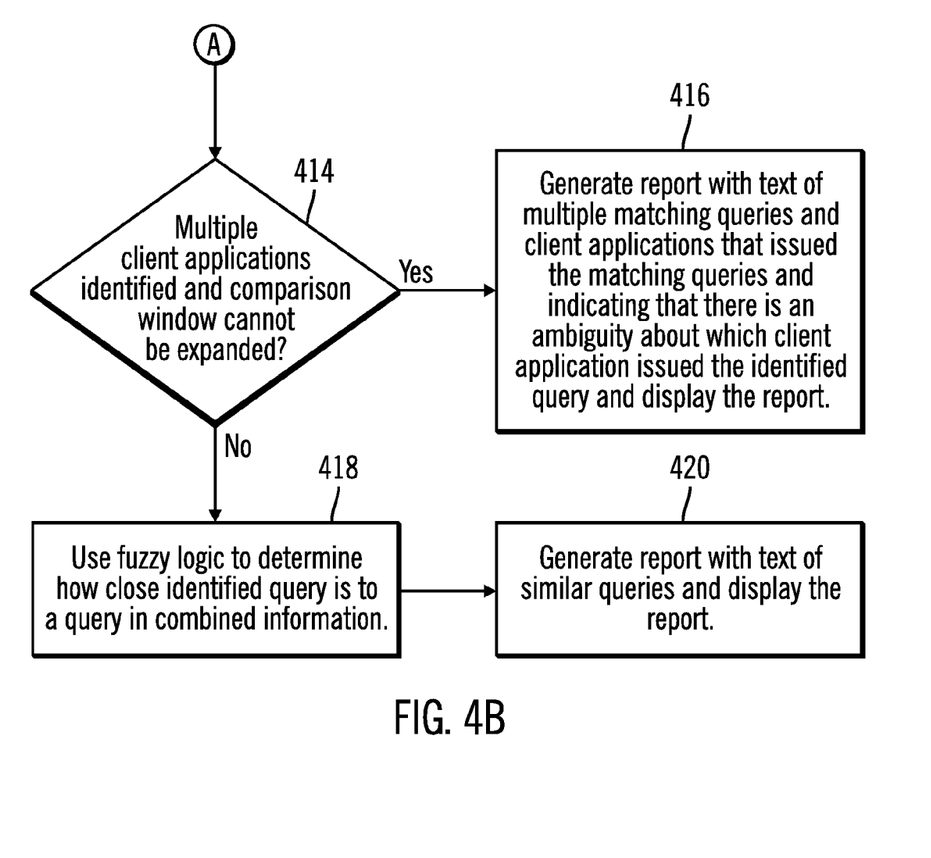

FIG. 4 illustrates more detailed logic for identifying a client application that has issued a problem query in accordance with embodiments of the invention. FIG. 4 is formed by FIGS. 4A and 4B, and processing moves from block 410 of FIG. 4A to block 414 of FIG. 4B. In certain embodiments, control begins at block 400 with combining the client information 114 and the database monitoring information 172 and continues to block 402 to identify a query causing problems while running in the database 192 using the combined information 196.

With reference to FIG. 4, in block 400, the evaluator 150 combines the client information 114 and the database monitoring information 172. The combined information 196 includes a list of queries (with the text of the queries) and performance information for each of the queries. For example, the performance information is obtained from the query performance statistics in table 350, which is storing database monitoring information 174. In embodiments in which the client information 114 and database monitoring information 174 are stored in relational tables, the evaluator 150 joins the tables (e.g., tables 300, 350) of the client information 114 and the database monitoring information 174. In certain embodiments, the tables (e.g., tables 300, 350) of the client information 114 and the database monitoring information 174 are joined based on an exact match of query text. In certain alternative embodiments, tables (e.g., tables 300, 350) of the client information 114 and the database monitoring information 174 are joined based on matching similar query text (i.e., using "fuzzy logic").

Figure 5:
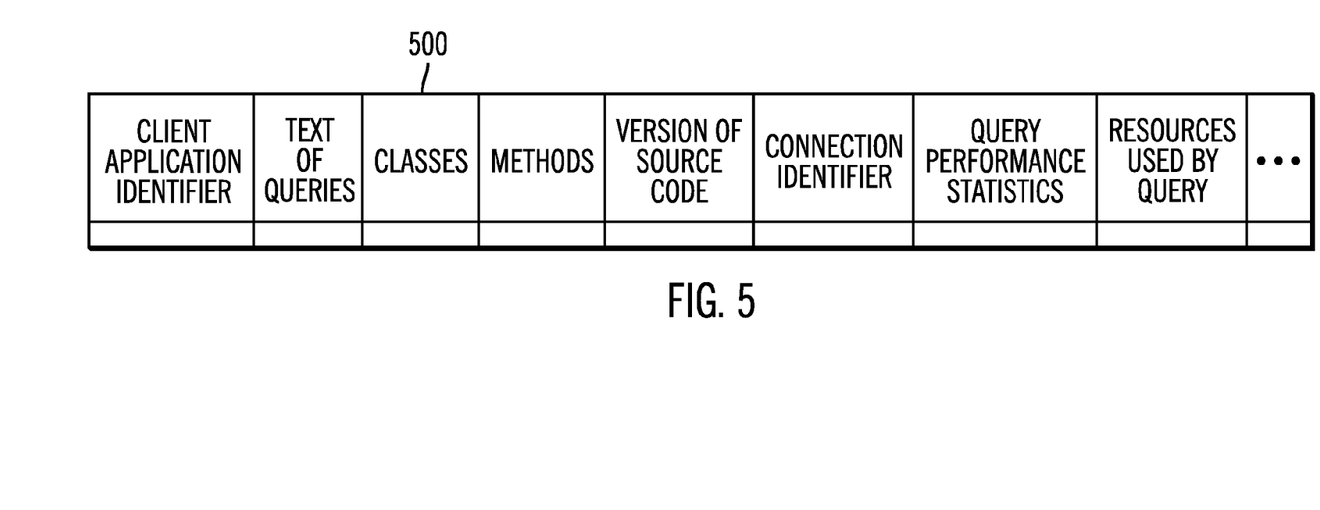
FIG. 5 illustrates an example table of joined information in accordance with certain embodiments.
Figure 6A:
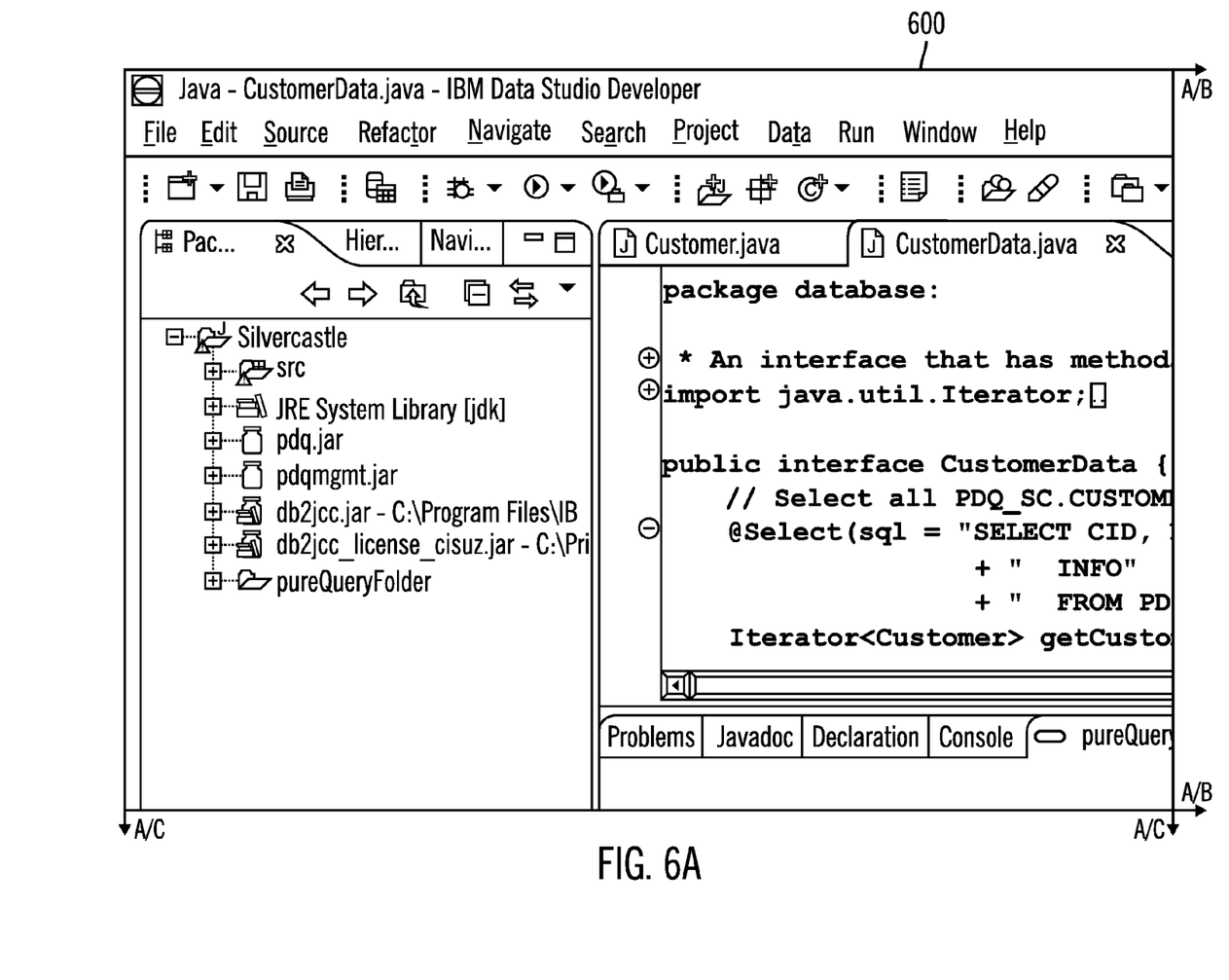
FIG. 6 illustrates a user interface showing a rendering of a join of client information and database monitoring information in accordance with certain embodiments.
Figure 6B:
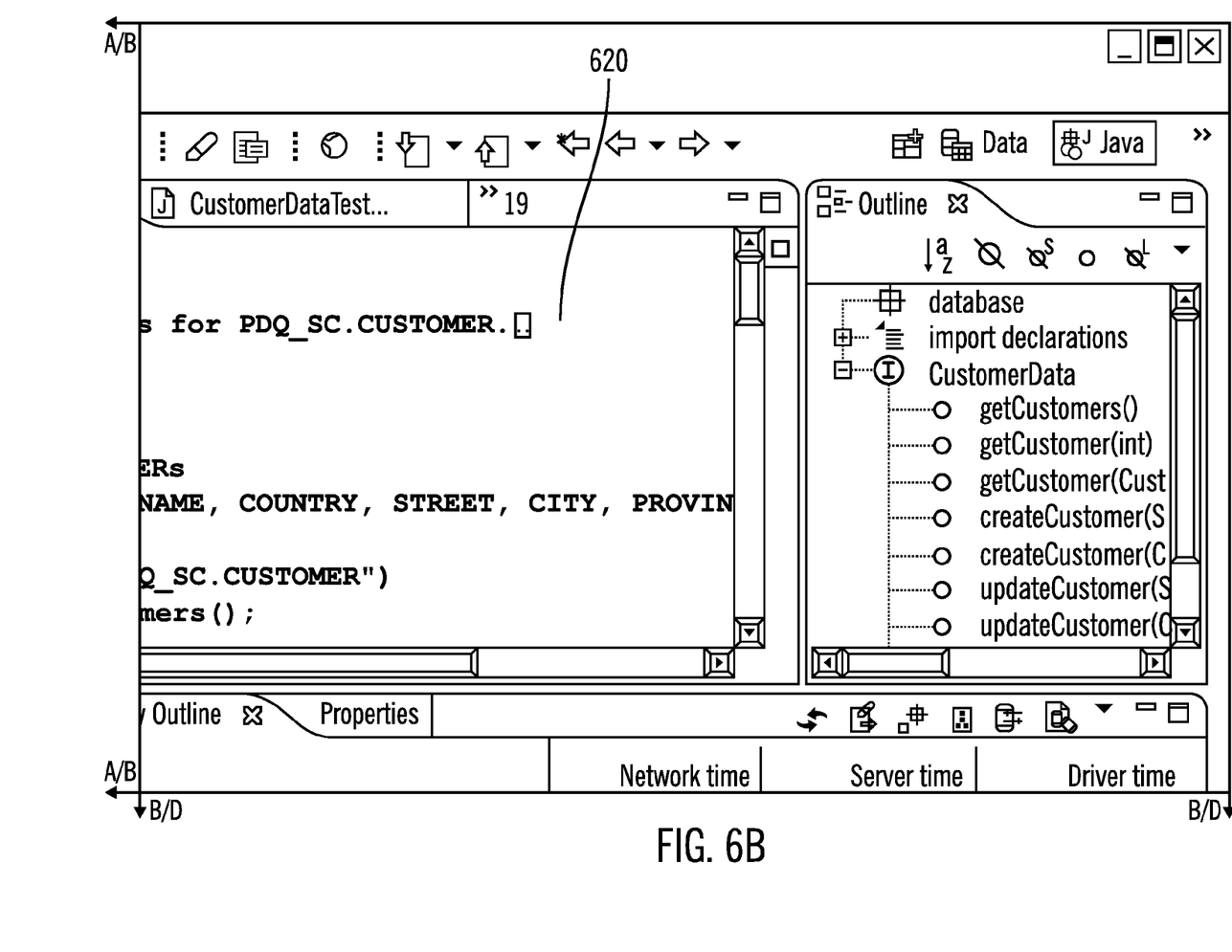
Figure 6C:
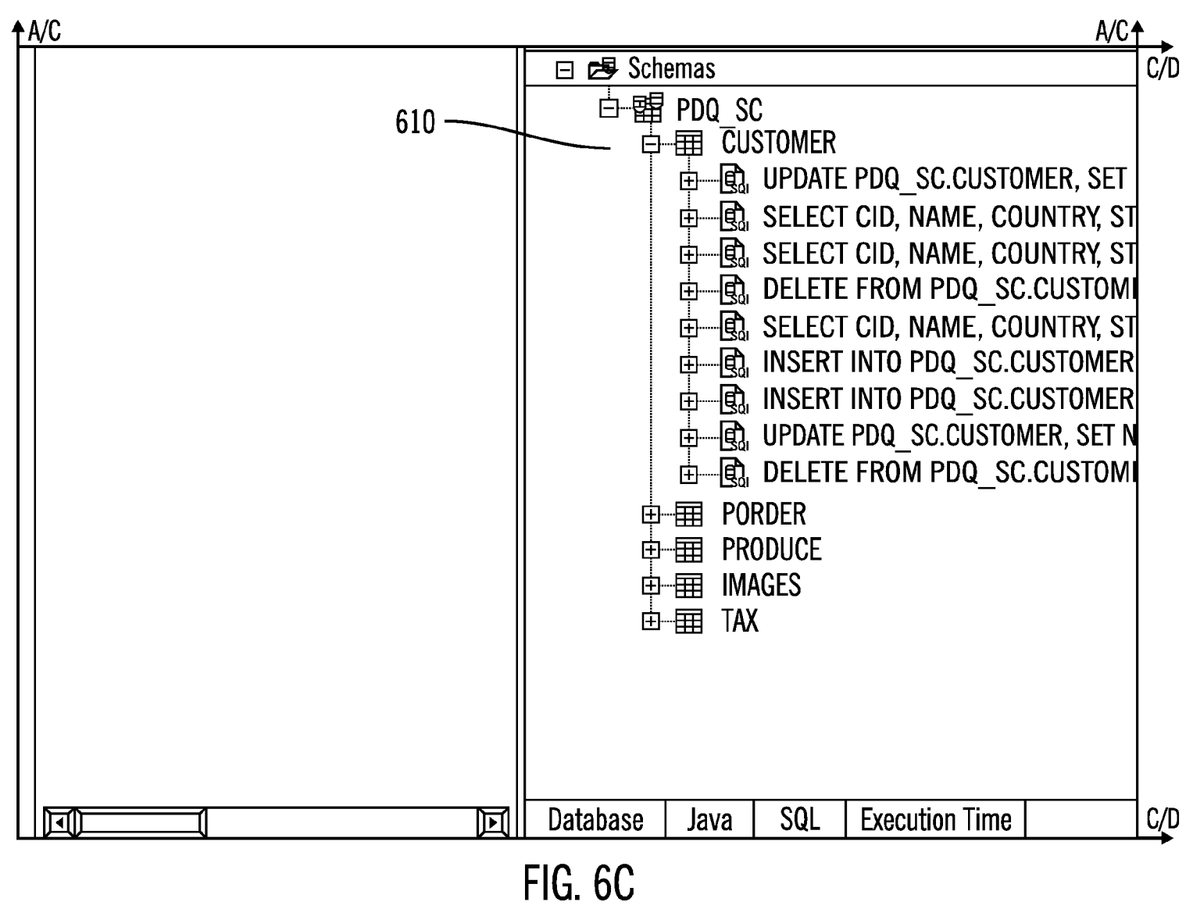
Figure 6D:
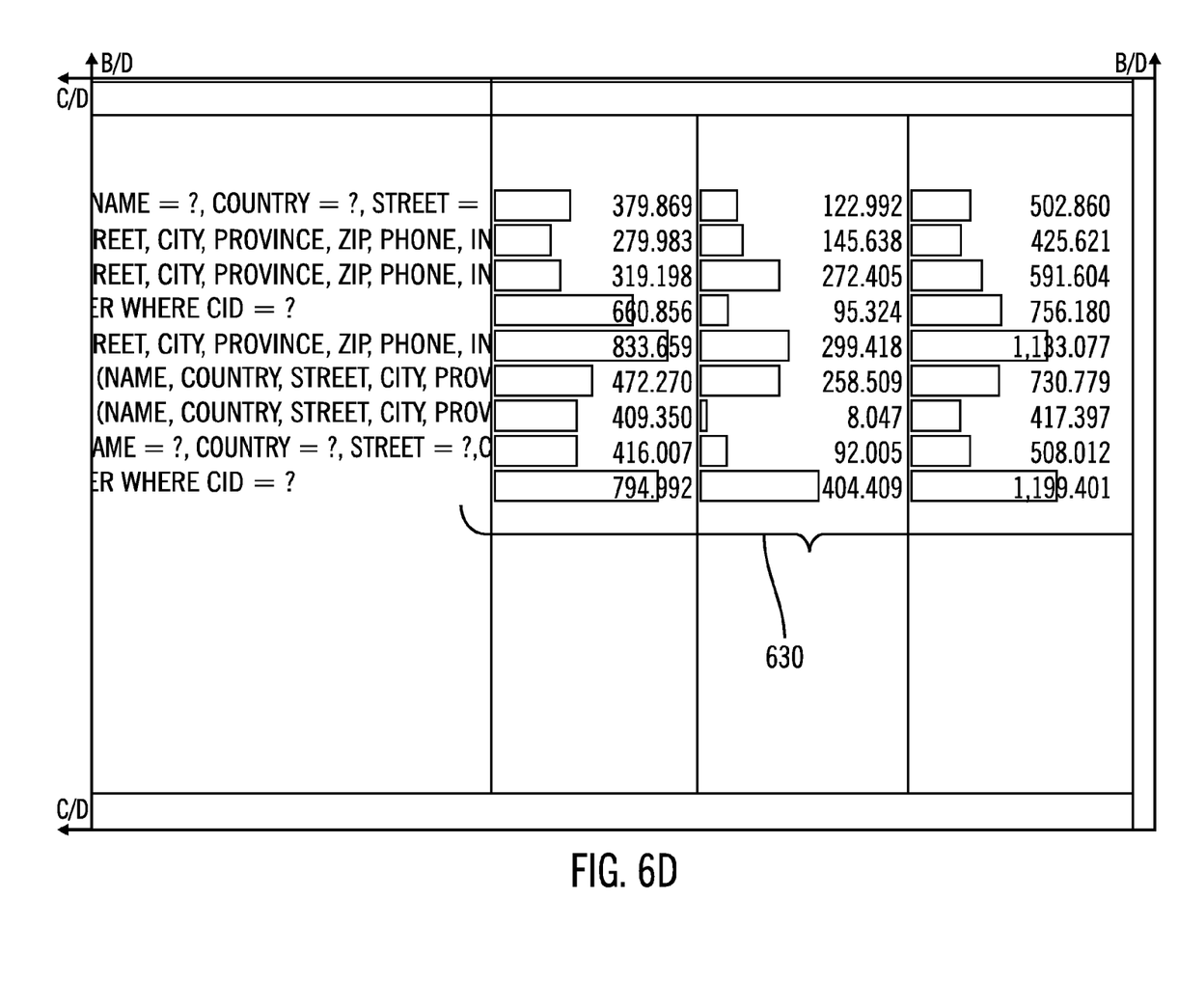

FIG. 5 illustrates an example table 500 of joined information 194 in accordance with certain embodiments. For example, the table 500 of joined information 194 includes: a column identifying a client application issuing a query, a column for the text of the query used, a column for classes, a column for methods, a column for a version of the source code that issues the query, a column for a connection identifier, a column for query performance statistics of the query, a column for resources that the query uses, and may include other columns (as represented by the ellipses in table 5).

After combining the client information 114 and the database monitoring information 172, the evaluator 150 attempts to identify the client application 110 being run and the location of the source code running the query. Knowledge of this client application 110 gives the DBA monitoring the client application 110 immediate access to the client application's information in the relational tables (e.g., table 300). In certain embodiments, any database monitoring tool 172 that has access to the query may use the relational tables (e.g., table 300) storing the client information 114 or the combined information 196 to identify the client application issuing the query.

In certain embodiments, the evaluator 150 joins the text of the queries stored in the client information 114 and the database monitoring information 174. Because the text of the queries is joined, no special identification information needs to be saved on the client application side in client information 114 or on the monitoring side in database monitoring information 174.

In FIG. 4, in block 402, using the combined information 196, the evaluator 150 identifies a query causing problems while running in the database 192. For example, the evaluator 150 may identify the query that is running for the longest period of time as a problem query. In certain embodiments, the combined information may be sorted based on the time that each query has taken during the execution of the query.

In block 404, the evaluator 150 compares the text of the identified query to the text of queries in the combined information 196. The evaluator 150 may find 1) that the text of the identified query exactly matches the text of one query in the combined information 196; 2) that the text of the identified query exactly matches the text of two or more (i.e., multiple) queries in the combined information 196; or 3) that the text of the identified query does not exactly match the text of any query in the combined information 196.

In block 406, the evaluator 150 determines whether a single client application 110 has been identified as having issued the query. If so, processing continues to block 408, otherwise, processing continues to block 410. In particular, if the text of the identified query exactly matches the text of one query in the combined information 196, then the evaluator 150 obtains the client application identifier for that matching query from the client information 114 and determines that a single client application 110 has been identified as having issued the identified query.

In certain alternative embodiments, instead of comparing the text of the identified query to the text of queries in the combined information 196, the evaluator compares the text of the identified query to the text of queries in the client information 114. For example, in such alternative embodiments, in block 406, the evaluator 150 determines whether the identified query is in only one row of the table 500 of the client information 114, and, if so, in block 406, the evaluator 150 determines that the single client application associated with the one row has been identified as having issued the query. In such an embodiment, processing continues from block 406 to block 408.

In block 408, the evaluator 150 generates a report with the text of the matching query and the client application that issued the matching query and displays the report (e.g., to the application developer). The application developer may use the report to address the problems caused by running of the query against the database 192 (e.g., by rewriting the source code). As will be discussed below, FIG. 6 shows a tool that can inform the application developer on how a client application 110 performs against the database 192 and provides a means to resolve problems by updating the client application 110.

In block 410, the evaluator 150 determines whether multiple client applications have been identified and a comparison window can be expanded. If so, processing continues to block 412, otherwise, processing continues to block 414 (FIG. 4B). In particular, if the evaluator 150 finds that the text of the identified query exactly matches the text of multiple queries in the combined information 196, the evaluator 150 changes the comparison window to try to identify one client application that generated the identified query. The comparison window size may be described as a number of queries being compared.

In block 412, the evaluator 150 expands the comparison window and attempts to identify a single client application that issued the identified query. For example, if multiple client applications 110 issue the same query, the evaluator 150 enlarges the comparison window to unambiguously identify the client application 110 that issued the query. For example, assume that Application 1 issued queries Q1, Q2, Q3, and Q4 in this order, while Application 2 issued queries Q1, Q2, Q5, and Q6 in this order. Assume that the database monitoring tool 172 identified Q2 to be a problem query. Now, there is an ambiguity: is Q2 issued by Application 1 or Application 2? The comparison window size is one (1), and, in this example, a single query comparison is too small to identify which application issued Q2. In this example, the evaluator 150 may find out which query is issued after Q2. If the connection that issued query Q2 then issued Q3, the evaluator 150 recognizes that the application that issued Q2 is Application 1. If the connection issued Q5, the evaluator 150 recognizes that the application that issued Q2 is Application 2. Now, the comparison window size is two (2). The comparison window may be expanded during the comparison until no ambiguity is detected. Thus, besides a single exact match of the text of the identified query and the text of a query in the combined information 196, there are two other possible outcomes: 1) there are multiple matches (i.e., ambiguity is detected) even with the largest comparison window or 2) no matches are found.

In block 414, the evaluator determines whether multiple client applications have been identified and the comparison window cannot be expanded. If so, processing continues to block 416, otherwise, processing continues to block 418. In block 416, because the comparison window has been made the largest possible but there are still multiple matches, the evaluator 150 generates a report with the text of the matching queries and the client applications that issued the matching queries and indicating that there is an ambiguity about which client application issued the identified query and displays the report (e.g., to the application developer). For example, the evaluator 150 presents the ambiguity to the application developer and lets the application developer decide if there are additional criteria that may be applied (e.g., the application developer knows it is Application 1 because Application 2 cannot be run during the time the problem is reported).

Processing continues to block 418 when no exact match to the text of the identified query is found (i.e., the text of the identified query does not match the text of any query in the combined information 196. In block 418, the evaluator 150 employs fuzzy logic to determine how close the text of the identified query and the text of the queries in the combined information 196 are to each other. That is, the fuzzy logic attempts to match the text of the identified query to the text of the queries in the combined information 196. This match is called "fuzzy" because the match is not an exact match between the text of the identified query and the text of another query; instead, it is a "close enough" match (e.g., the text of the identified query is similar to the text of another query). In block 420, the evaluator 150 generates a report with the text of similar queries and displays the report (e.g., to the application developer).

In addition, certain embodiments allow non-exact matches, and this expands on the usefulness of incomplete information gathered on both the client application side and the database monitoring side. In a general case, given some queries gathered in the database monitoring information 174 by the database monitoring tool 172, finding the same queries in the combined information 196 is analogous to a text search problem. Various text search techniques may be applied to locate similar queries in the combined information 196. For example, given a query text string, the evaluator 150 breaks up the query text string into a set of fragments and looks for these fragments in the client application's source code. Using the example above, the fragments from Application 1 are (Q1, Q2), (Q2, Q3), (Q3, Q4) while the fragments from Application 2 are (Q1, Q2), (Q2, Q5), and (Q5, Q6). In certain embodiments, the evaluator 150 presents a list of possible matches based on scoring the matches. By being "fuzzy" (i.e., not exact) in the matches, embodiments allow legacy applications and tools to participate in the problem determination scenario without modifications.

In certain alternative embodiments, the logic of blocks 400 and 402 is switched, so that a problem query is identified, and then the client information 114 and the database monitoring information 172 are combined. In such alternative embodiments, the database monitoring tool 172 identifies a query causing problems while running in the database 192. For example, the database monitoring tool 172 allows the setting of criteria to identify a threshold for reporting a query as a problem. For example, one criterion may be set to indicate that a query that runs for more than 10 seconds should be flagged a problem query. Another criterion may be set to indicate that a query that deadlocks with another query should be flagged.

FIG. 6 illustrates a user interface 600 showing a rendering of a join of the client information 114 and the database monitoring information 174 in accordance with certain embodiments. FIG. 6 is formed by FIGS. 6A, 6B, 6C, and 6D. In the rendering of FIG. 6, the client information 114 is captured from looking at the source code 620. Also, the evaluator 150 has joined the client information 114 and the database monitoring information 174 to obtain a list of queries 610 (under the pureQuery Outline tab), grouped by the tables that these queries access and along with performance information 630 (e.g., from the database monitoring information 174). The bars 630 represent the time that each query has taken during the execution of the query. The evaluator 150 brings the information 610, 630 together through the joining of the queries in the client information 114 and the database monitoring information 174, and this allows the application developer to visualize the performance characteristics of the client application 110, where the hot spots for the queries are, and where to focus first. The "Network time", "Server time", etc could change depending on the capabilities of the database monitoring tool 172. This generic approach allows any monitoring/performance information related to the query to be rendered with the client application's queries.

From FIG. 6, looking at the performance information 630, the evaluator 150 identifies the query "DELETE FROM PDQ_SC.CUSTOMER WHERE CID=?" as a problem query. Then, the evaluator 150 goes on to try to identify a client application 110 that issued the problem query "DELETE FROM PDQ_SC.CUSTOMER WHERE CID=?".

Thus, embodiments provide client side and database side end to end problem determination and monitoring.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc.

Figure 7:
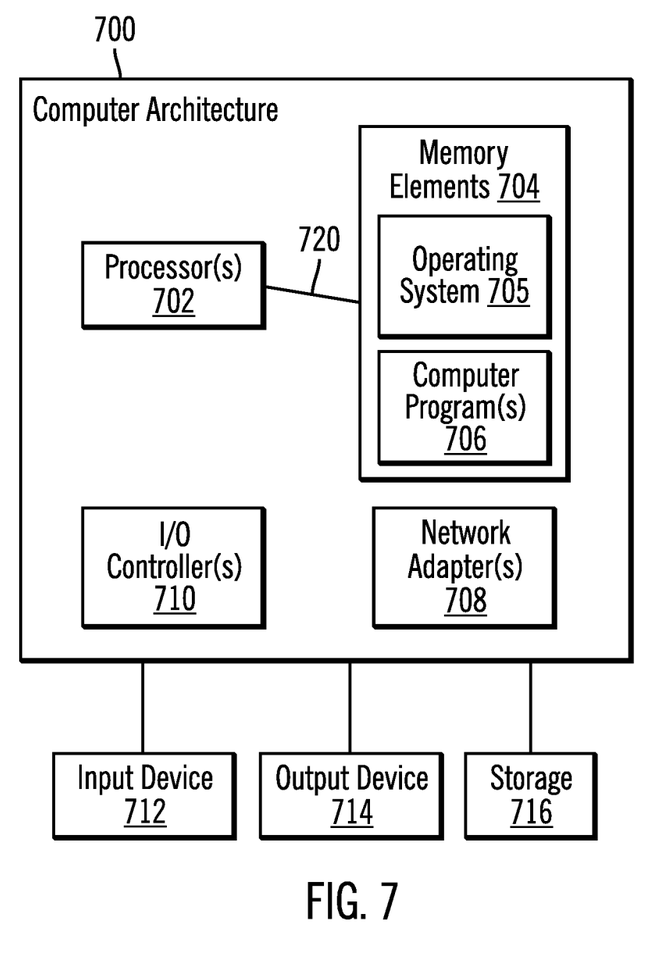
FIG. 7 illustrates a system architecture that may be used in accordance with certain embodiments.

FIG. 7 illustrates a system architecture 700 that may be used in accordance with certain embodiments. Client computer 100 and/or server computer 160 may implement system architecture 700. The system architecture 700 is suitable for storing and/or running program code and includes at least one processor 702 coupled directly or indirectly to memory elements 704 through a system bus 720. The memory elements 704 may include local memory employed during an actual run of the program code, bulk storage, and cache memories which provide temporary storage of at least some program code in order to reduce the number of times code must be retrieved from bulk storage during run time. The memory elements 704 include an operating system 705 and one or more computer programs 706.

Input/Output (I/O) devices 712, 714 (including but not limited to keyboards, displays, pointing devices, etc.) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The system architecture 700 may be coupled to storage 716 (e.g., a non-volatile storage area, such as magnetic disk drives, optical disk drives, a tape drive, etc.). The storage 716 may comprise an internal storage device or an attached or network accessible storage. Computer programs 706 in storage 716 may be loaded into the memory elements 704 and run by a processor 702 in a manner known in the art.

The system architecture 700 may include fewer components than illustrated, additional components not illustrated herein, or some combination of the components illustrated and additional components. The system architecture 700 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

The invention claimed is:

1. A method, comprising:
   collecting, with a processor of a computer, client information for client applications running on a client computer, wherein the client information includes a client application identifier for each client application that issues queries to a database along with text of each of the queries that the client application issues;
   collecting, with the processor of the computer, database monitoring information that includes the text of each of the queries issued against the database and performance information for each of the queries, wherein the database monitoring information does not include the client application identifier of each client application that issues the queries;
   matching, with the processor of the computer, the text of the queries in the client information and the text of the queries in the database monitoring information to obtain combined information that provides the client application identifier and the performance information for each of the queries;
   identifying, with the processor of the computer, a problem query using the combined information;
   identifying, with the processor of the computer, multiple client applications that issued the problem query using the combined information; and
   in response to determining that a comparison window can be expanded, wherein the comparison window represents a number of queries that were issued in a particular order and include the problem query being compared to the combined information,
   expanding the comparison window; and
   attempting to identify a single client application that issued the problem query using the expanded comparison window.

2. The method of claim 1, further comprising:
   in response to determining that the comparison window can not be expanded,
   generating a report with information indicating that there is an ambiguity regarding which client application issued the problem query.

3. The method of claim 1, further comprising:
   determining that no exact match to another problem query has been found;
   using fuzzy logic to identify queries that are similar to the another problem query in the combined information; and
   generating a report with the similar queries.

4. The method of claim 1, wherein the combining further comprises:
   joining a table storing the client information with a table storing the database monitoring information to obtain a table of joined information.

5. The method of claim 4, further comprising:
   identifying at least one client application that issued the problem query by determining that the problem query is found in one row of the table of the joined information and locating the client application identifier in the one row.

6. The method of claim 1, further comprising:
   generating a user interface that displays the queries grouped by tables that the queries access.

7. The method of claim 6, further comprising:
   for each of the queries, displaying the performance information using bars to represent time that the query has taken during execution of the query.

8. A computer program product comprising a computer readable storage medium storing computer readable program code that, when executed on a processor of a computer, causes the computer to:
   collect client information for client applications running on a client computer, wherein the client information includes a client application identifier for each client application that issues queries to a database along with text of each of the queries that the client application issues;
   collect database monitoring information that includes the text of each of the queries issued against the database and performance information for each of the queries, wherein the database monitoring information does not include the client application identifier of each client application that issues the queries;
   match the text of the queries in the client information and the text of the queries in the database monitoring information to obtain combined information that provides the client application identifier and the performance information for each of the queries;
   identify a problem query using the combined information;

identify multiple client applications that issued the problem query using the combined information; and in response to determining that a comparison window can be expanded, wherein the comparison window represents a number of queries that were issued in a particular order and include the problem query being compared to the combined information, expand the comparison window; and attempt to identify a single client application that issued the problem query using the expanded comparison window.

9. The computer program product of claim 8, wherein the computer readable program code that, when executed on the processor of the computer, causes the computer to:

in response to determining that the comparison window can not be expanded, generate a report with information indicating that there is an ambiguity regarding which client application issued the problem query.

10. The computer program product of claim 8, wherein the computer readable program code that, when executed on the processor of the computer, causes the computer to:

determine that no exact match to another problem query has been found;

use fuzzy logic to identify queries that are similar to the another problem query in the combined information; and generate a report with the similar queries.

11. The computer program product of claim 8, wherein the computer readable program code that, when executed on the processor of the computer, causes the computer to:

join a table storing the client information with a table storing the database monitoring information to obtain a table of joined information.

12. The computer program product of claim 11, wherein the computer readable program code that, when executed on the processor of the computer, causes the computer to:

identify at least one client application that issued the problem query by determining that the problem query is found in one row of the table of the joined information and locating the client application identifier in the one row.

13. The computer program product of claim 8, wherein the computer readable program code that, when executed on the processor of the computer, causes the computer to:

generate a user interface that displays the queries grouped by tables that the queries access.

14. The computer program product of claim 13, wherein the computer readable program code that, when executed on the processor of the computer, causes the computer to:

for each of the queries, display the performance information using bars to represent time that the query has taken during execution of the query.

15. A system, comprising:

a processor;

memory; and circuitry to perform operations, the operations comprising:

collecting client information for client applications running on a client computer, wherein the client information includes a client application identifier for each client application that issues queries to a database along with text of each of the queries that the client application issues;

collecting database monitoring information that includes the text of each of the queries issued against the database and performance information for each of the queries, wherein the database monitoring information does not include the client application identifier of each client application that issues the queries;

matching the text of the queries in the client information and the text of the queries in the database monitoring information to obtain combined information that provides the client application identifier and the performance information for each of the queries;

identifying a problem query using the combined information;

identifying, with the processor of the computer, multiple client applications that issued the problem query using the combined information; and in response to determining that a comparison window can be expanded, wherein the comparison window represents a number of queries that were issued in a particular order and include the problem query being compared to the combined information, expanding the comparison window; and attempting to identify a single client application that issued the problem query using the expanded comparison window.

16. The system of claim 15, wherein the operations further comprise:

in response to determining that the comparison window can not be expanded, generating a report with information indicating that there is an ambiguity regarding which client application issued the problem query.

17. The system of claim 15, wherein the operations further comprise:

determining that no exact match to another problem query has been found;

using fuzzy logic to identify queries that are similar to the another problem query in the combined information; and generating a report with the similar queries.

18. The system of claim 15, wherein the operations for combining further comprise:

joining a table storing the client information with a table storing the database monitoring information to obtain a table of joined information.

19. The system of claim 18, wherein the operations further comprise:

identifying at least one client application that issued the problem query by determining that the problem query is found in one row of the table of the joined information and locating the client application identifier in the one row.

20. The system of claim 15, wherein the operations further comprise:

generating a user interface that displays the queries grouped by tables that the queries access.

21. The system of claim 20, wherein the operations further comprise:

for each of the queries, displaying the performance information using bars to represent time that the query has taken during execution of the query.

* * * * *